United States Patent Office.

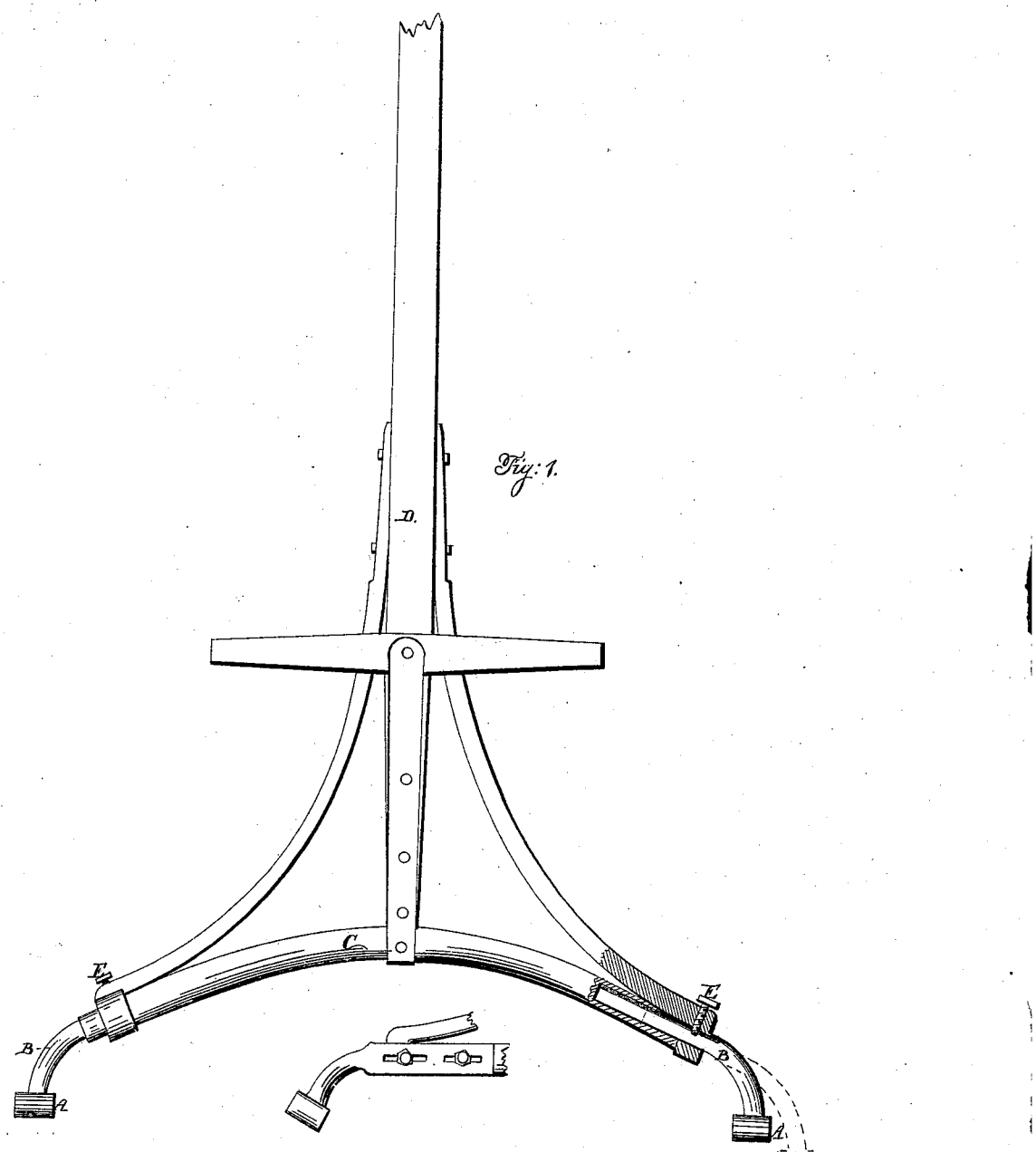

A. R. BARTRAM, OF REDDING, CONNECTICUT.

Letters Patent No. 64,936, dated May 21, 1867.

---

IMPROVEMENT IN ATTACHING CARRIAGE-THILLS.

---

The Schedule referred to in these Letters Patent and making part of the same.

---

TO ALL WHOM IT MAY CONCERN:

Be it known that I, A. R. BARTRAM, of Redding, in the county of Fairfield, and State of Connecticut, have invented a new and useful Improvement in Attachments for Carriage-Thills or Tongues; and I do hereby declare the following to be a full, clear, and exact description of the same, reference being had to the accompanying drawings, in which—

Figure 1 is a plan of my invention.

My invention consists in rendering the couplings of a carriage-tongue or thills movable laterally without the employment of any hinged parts.

That others may understand the construction of my invention, I will particularly describe it.

The coupling-loops or eyes A A are forged upon short bars or tangs, B B, which are bent in proper form to enter the socket of the cross-head C, to which the tongue D or the carriage-thills are attached, and strengthened by proper braces. The tang B has a spline or groove upon one of its sides, into which the point of the set-screw E should always rest, so that when said screw is turned back slightly so as to release the tang it will still prevent any rotation of said tang upon its axis. The bar C may be constructed of gas or other iron pipe of proper size, and may be either curved or straight, as shown. These portions, within which the tangs B B are inserted, must, however, be straight in any event, as, if they were otherwise, the axial lines of the two coupling-eyes would not coincide except when in one certain position, and the utility of the device would be destroyed. If desirable, as it may be for heavy carriages, the cross-bar C may be made solid, and the coupling-eyes forged on slotted plates, as represented in Figure 3, with clamping-screws. This will not be so neat or convenient an arrangement as that first described. Or the tangs B B may be inserted in sockets of metal, attached to the ends of a solid cross-bar, and secured at the desired point by a clamping-screw, or some other convenient device. The distance between the coupling-clips upon the forward axles of carriage is hardly ever the same in any two instances, unless belonging to the same owner, who has caused them to be constructed with special reference to the convenience of shifting thills or tongue; and yet it frequently happens that it is highly desirable to be able to substitute a tongue in the place of the thills, so that two horses may be used instead of one; and to insure the possibility of doing this when the change has not been provided for by the carriage-maker is of importance, and renders it necessary that the coupling-eyes should be adjustable laterally without changing the parallelism and coincidence of the axial lines of the said eyes.

Having described my invention, what I claim as new, and desire to secure by Letters Patent, is—

1. The adjustable couplings A, in combination with the cross-bar C, substantially as set forth.

2. The tang B of the coupling A, provided with a groove, as set forth, in combination with the socketed cross-bar C and the set-screw E.

A. R. BARTRAM.

Witnesses:
DAVID S. BARTRAM,
LEWIS QUIEN.